United States Patent [19]

Tauvron

[11] Patent Number: 5,447,218
[45] Date of Patent: Sep. 5, 1995

[54] LOCK-UP CLUTCH FOR A HYDROKINETIC COUPLING APPARATUS, IN PARTICULAR FOR A MOTOR VEHICLE

[75] Inventor: Fabrice Tauvron, Creteil, France
[73] Assignee: Valeo, Paris Cedex, France
[21] Appl. No.: 128,102
[22] Filed: Sep. 29, 1993

[30] Foreign Application Priority Data

Oct. 2, 1992 [FR] France ............... 92 11708

[51] Int. Cl.⁶ .................. F16D 13/58; F16F 15/32
[52] U.S. Cl. .............. 192/110 R; 74/573 R; 192/3.29; 192/106.2
[58] Field of Search ......... 192/3.29, 110 R, 106.2, 192/30 V; 74/573 R

[56] References Cited

U.S. PATENT DOCUMENTS

| | | | |
|---|---|---|---|
| 79,984 | 7/1868 | Jones | 74/573 R X |
| 2,927,821 | 3/1960 | Palmer | 74/573 R X |
| 4,890,706 | 1/1990 | Miura et al. | |
| 5,086,892 | 2/1992 | Schierling | 192/3.29 |
| 5,119,911 | 6/1992 | Bochot et al. | 192/3.29 |
| 5,259,269 | 11/1993 | Swenson | 74/573 R |

FOREIGN PATENT DOCUMENTS

| | | | |
|---|---|---|---|
| 2570452 | 3/1986 | France. | |
| 2539491 | 3/1977 | Germany | 192/30 V |
| 3230021 | 2/1984 | Germany | 74/573 R |
| 3230024 | 2/1984 | Germany | 74/573 R |
| 3434304 | 3/1986 | Germany | 192/110 R |
| 1030544 | 5/1966 | United Kingdom | 74/573 R |
| 2214999 | 9/1989 | United Kingdom. | |
| 9209826 | 6/1992 | WIPO. | |

*Primary Examiner*—Rodney H. Bonck
*Attorney, Agent, or Firm*—Longacre & White

[57] ABSTRACT

A hydrokinetic coupling apparatus or fluid coupling, especially for a motor vehicle, includes a lock-up clutch which comprises a device in the form of a piston and a torsion damper. The damper is arranged beside one of the faces of the piston which is referred to as the fastening face. The piston has a plurality of integral projecting elements on which at least one balancing plate is fitted.

9 Claims, 4 Drawing Sheets

LOCK-UP CLUTCH FOR A HYDROKINETIC COUPLING APPARATUS, IN PARTICULAR FOR A MOTOR VEHICLE

FIELD OF THE INVENTION

The present invention relates to lock-up clutches for a hydrokinetic coupling apparatus or fluid coupling, in particular for motor vehicles, the lock-up clutch being of the kind comprising a device in the form of a piston and a torsion damper, the said damper being disposed beside one of the faces of the piston which, for convenience, is referred to as its fastening face.

BACKGROUND OF THE INVENTION

One such clutch is described in the specification of French published patent application FR 2 668 234A and the corresponding U.S. Pat. No. 5,119,911. This lock-up clutch consists of a rotatable assembly which has to be balanced dynamically so as to eliminate any out of balance effects in particular, this being known per se.

Such balancing poses certain problems. In this connection it is not possible to pierce the transverse or radial portion of the piston in order to achieve the required balancing, because control chambers are formed on either side of the piston, the control of which is achieved by pressure inversion in these chambers, so that the chambers must be separate from each other.

Consideration can then be given to achieving balancing by forming holes at desired locations in the axially oriented peripheral flange of the piston. However, this is not satisfactory because any operation to form holes is itself a source of pollution: particles, which may for example appear as a result of burrs formed during the drilling operation, are liable to become detached and to contaminate the hydraulic fluid which is contained in the sealed casing in which the lock-up clutch and its associated fluid coupling are enclosed.

It is then also possible to consider a balancing operation using components welded on to the piston itself. This however poses problems of reliability and control, because in order to be certain that the connection has been properly made, it is necessary to use destructive testing.

DISCUSSION OF THE INVENTION

An object of the present invention is to overcome these drawbacks in a simple and inexpensive manner, and accordingly to provide a novel arrangement in which dynamic balancing can be achieved without any danger of pollution of the lock-up clutch arising, while at the same time giving a high degree of correct balancing.

According to the invention, a lock-up clutch for a hydrokinetic coupling apparatus, in particular for a motor vehicle, of the kind comprising a device consisting of a piston and a torsion damper, the said torsion damper being disposed beside one of the faces of the piston, referred to for convenience as the fastening face thereof, is characterised in that the piston has a plurality of projecting elements which are made integrally with the latter, for carrying at least one balancing member which is fitted on at least one of the said projecting elements.

Because of the presence of a plurality of projecting elements, a balancing member can be engaged on at least one of these projecting elements at the most appropriate position to give dynamic balancing. The material at the free end of the projecting element is then deformed so as to secure the balancing member on the piston by riveting. Thus, the invention ensures with absolute certainty that no contaminating particle can reach the hydraulic fluid of the hydrokinetic coupling apparatus. In addition, the riveting operation is performed in a positive manner without any need for destructive testing.

The riveting operation is preferably carried out cold, so that any deformations of the piston are minimised. This is in contrast to a welding operation, which would tend to give rise to thermal deformation.

The projecting elements may project with respect to the fastening face of the piston, so that it is possible to provide balancing members of quite large size. However, the opposite is also possible.

The projecting elements are preferably arranged at the same radial level as the stiffening ribs which it is conventional to provide on the piston. These minimise any deformation that may take place either during fastening of the balancing members or in operation. In addition, the stiffening ribs are arranged on a large diameter, and this is favourable for correct balancing.

Preferably, one of the guide rings which are a normal part of the torsion damper is of a non-circular shape such as polygonal. Accordingly, the balancing member can consist of a small plate engaged on at least one of the projecting elements, and it is able to be prevented from rotating by cooperation with one of the outer edges of the guide ring.

The invention will be more clearly understood on a reading of the description, which follows, of preferred embodiments of the invention, and which is given by way of example only and with reference to the accompanying drawings.

DESCRIPTION OF PREFERRED EMBODIMENTS OF THE INVENTION

Figure 3:
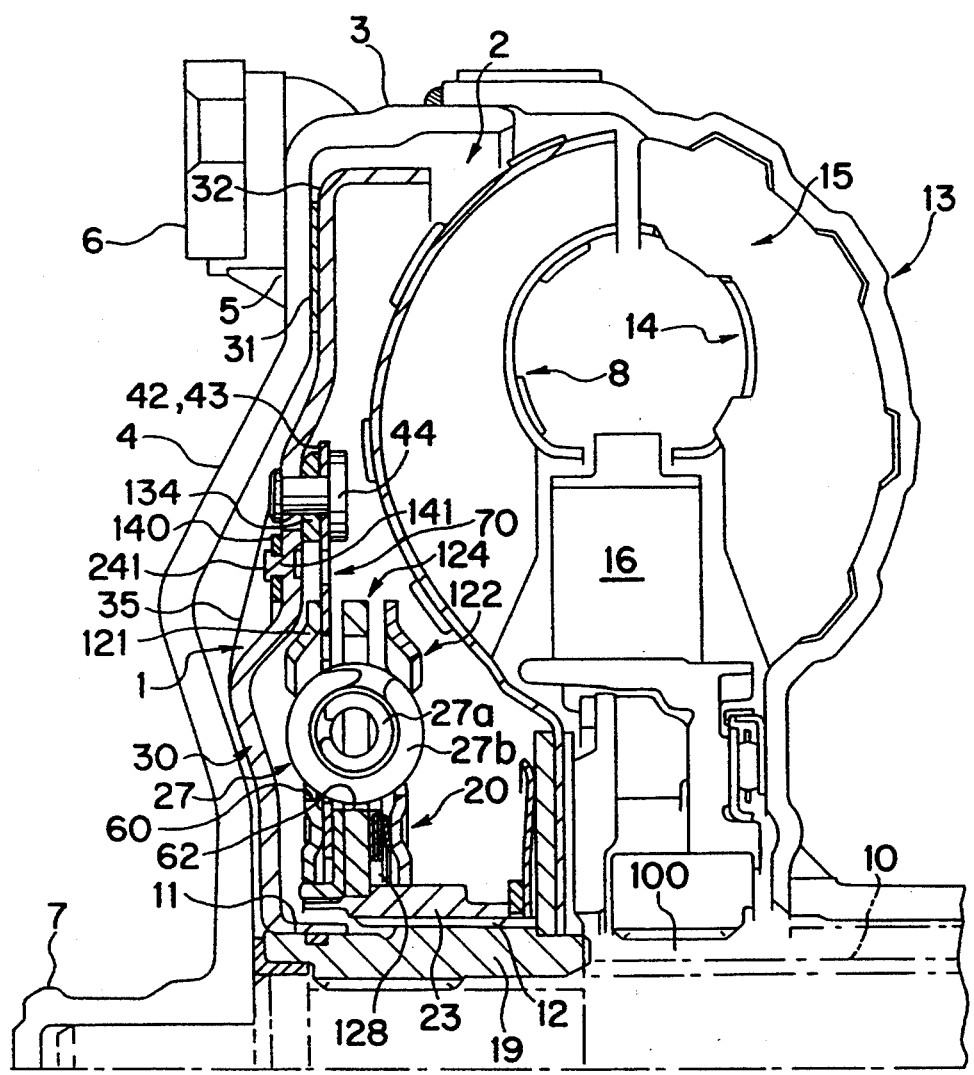
FIG. 3 is a half view in axial cross section, similar to FIG. 2 but showing another embodiment of the lock-up clutch according to the invention.

The drawings show a lock-up clutch 1 mounted in the interior of a sealed casing 2 (FIG. 3). The casing 2 constitutes a driving element, and is arranged to be coupled in rotation, in a manner which is known per se, to the crankshaft of the internal combustion engine of the motor vehicle, through a first shell member 3, 4.

The shell member 3, 4 is annular in shape and includes a base portion 4 which is oriented in a generally transverse direction. The base portion 4 is delimited at its outer periphery by an axially oriented annular flange 3. At its outer periphery, the base portion 4 has a transverse friction wall 5, and carries threaded members 6 for coupling it in rotation to the crankshaft, typically through a diaphragm. The base portion 4 also has a centring nose 7.

The first shell member 3, 4 is arranged to be joined in a sealed manner at its outer periphery (typically by welding) to a second shell member 13 (see FIG. 3). This second shell member 13 is so configured as to define a bladed impulse wheel 14. The impulse wheel is part of a hydrokinetic coupling apparatus (fluid coupling) 15 which is arranged in the casing 2. In this example, the fluid coupling comprises a torque converter 15, having a bladed turbine wheel 8 in facing relationship with the impulse wheel 14. The torque converter 15 also includes a reaction wheel 16 (see FIG. 3) which is mounted on a reaction sleeve 100 for rotation through a free wheel.

The turbine wheel 8 is secured at its inner periphery to an inner hub 9 (FIG. 1) or 19 (FIG. 3) which is mounted on a driven shaft 10, for rotation with the latter via an internal splined coupling. The inner hub 9 is secured by riveting to the turbine wheel 8, and has external splines 12, with a centring surface 11 at one end of the hub 9. The same is true for the inner hub 19 in FIG. 3.

It will be recalled that on starting of the vehicle, the turbine wheel 8 is driven in rotation by the impulse wheel 14, by virtue of the flow of fluid contained in the casing 2. The purpose of the lock-up clutch 1 is to prevent the occurrence of sliding effects and losses of power occurring between the turbine wheel 8 and impulse wheel 14 as a result of the foregoing, and after the vehicle and its engine have been started.

The clutch 1 is arranged between the turbine wheel 8 and the base portion 4 of the first shell member 3, 4. It includes a device which consists of a torsion damper 20 (see FIG. 3) and a piston 30. This device is movable axially, and the piston 30 (which is annular in shape) includes at its inner periphery a sleeve 234 which is engaged on the centring surface 11 of the inner hub 9 for axial sliding movement on the latter. The torsion damper 20 includes an output element in the form of an internally splined outer hub 23, 123 (FIG. 2) or 23 (FIG. 3). This outer hub is carried on the external splines 11 of the inner hub 9 or 19 respectively, so as to be coupled in rotation with the inner hub.

The piston 30 carries a friction liner 31 at its outer periphery. The liner 31 is typically attached to the piston by adhesive bonding, and is arranged to make frictional contact with the transverse wall 5 of the casing 2. For this purpose, the piston 30 has at its outer periphery a transverse wall 32 on which the friction liner 31 is fixed. It is of course possible to reverse this arrangement, with the wall 5 then having the liner 31 fixed to it.

The torsion damper 20 also includes an input part which is secured to the piston 30. The damper 20 is arranged beside one of the faces of the piston 30. This face is referred to in the remainder of this description, for convenience, as a fastening face. It will be noted that in FIGS. 2 and 3, this fastening face faces towards the turbine wheel 8 and away from the wall 4, while the piston 30 is hollow in shape.

Figure 2:
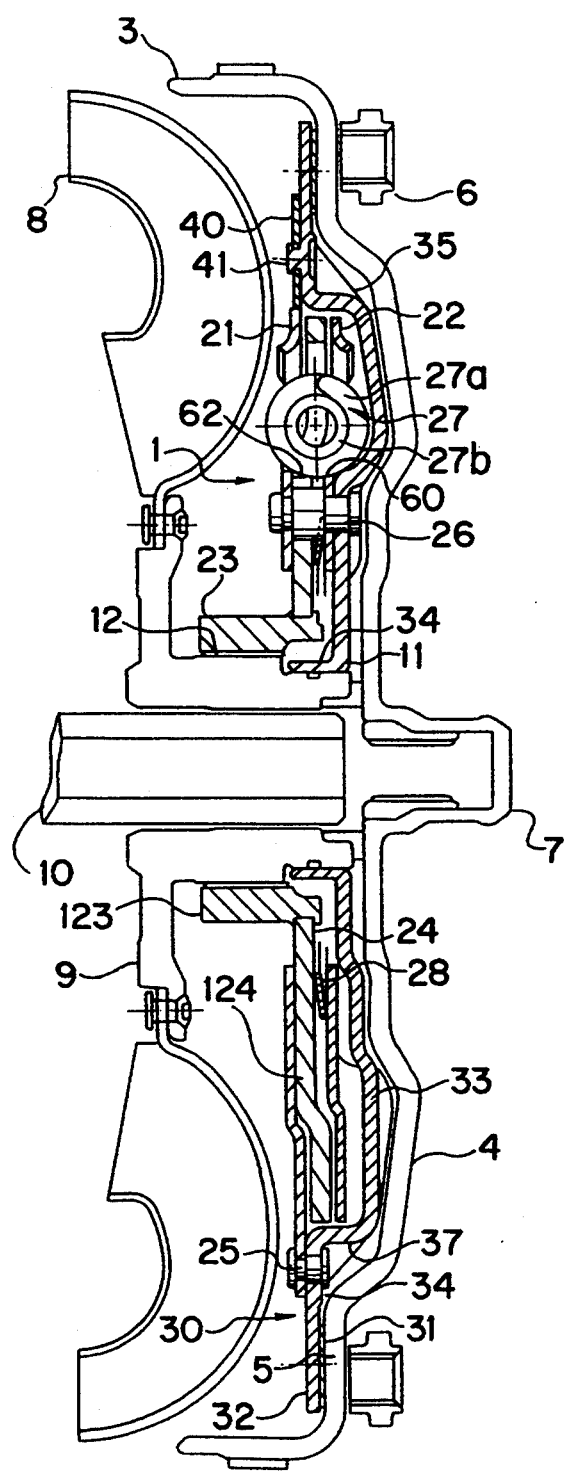
FIG. 2 is a view in cross section taken on the line 2—2 in FIG. 1.
Figure 4:
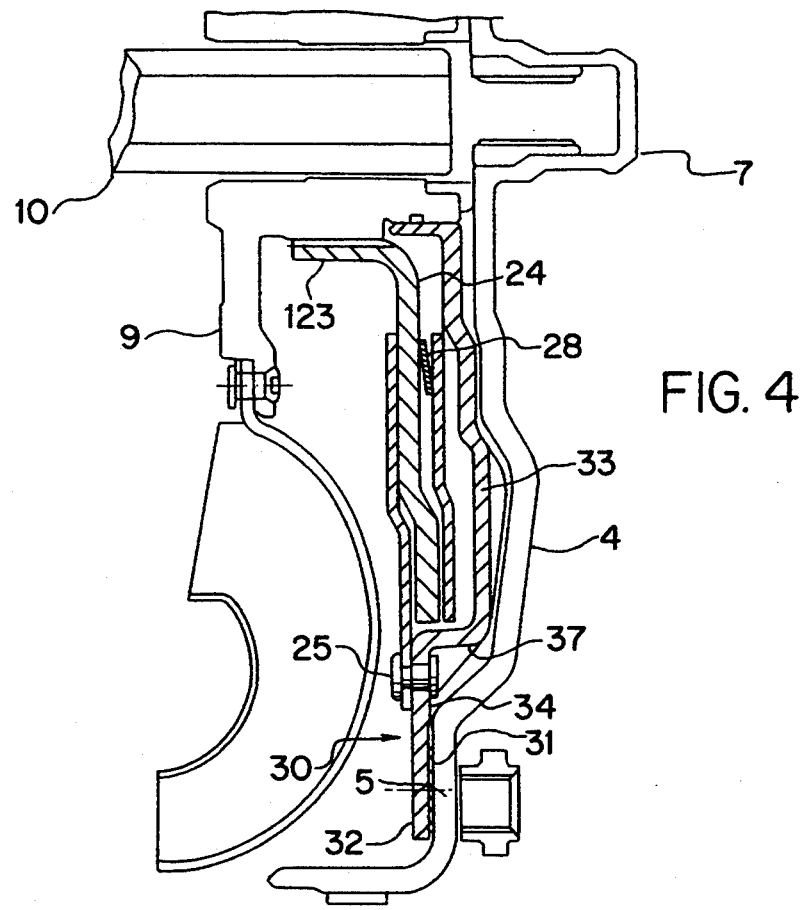
FIG. 4 is a partial view in cross section showing a variant of the lock-up clutch as shown in FIG. 2.

In FIGS. 2 and 4, the outer hub 23, 123 is part of an output part of the damper 20. The input part, 21, 22 in these Figures, and the output part 23, 123, are mounted for angular movement with respect to each other against the action of circumferentially acting resilient means 27, together with axially acting friction means 28.

Figure 1:
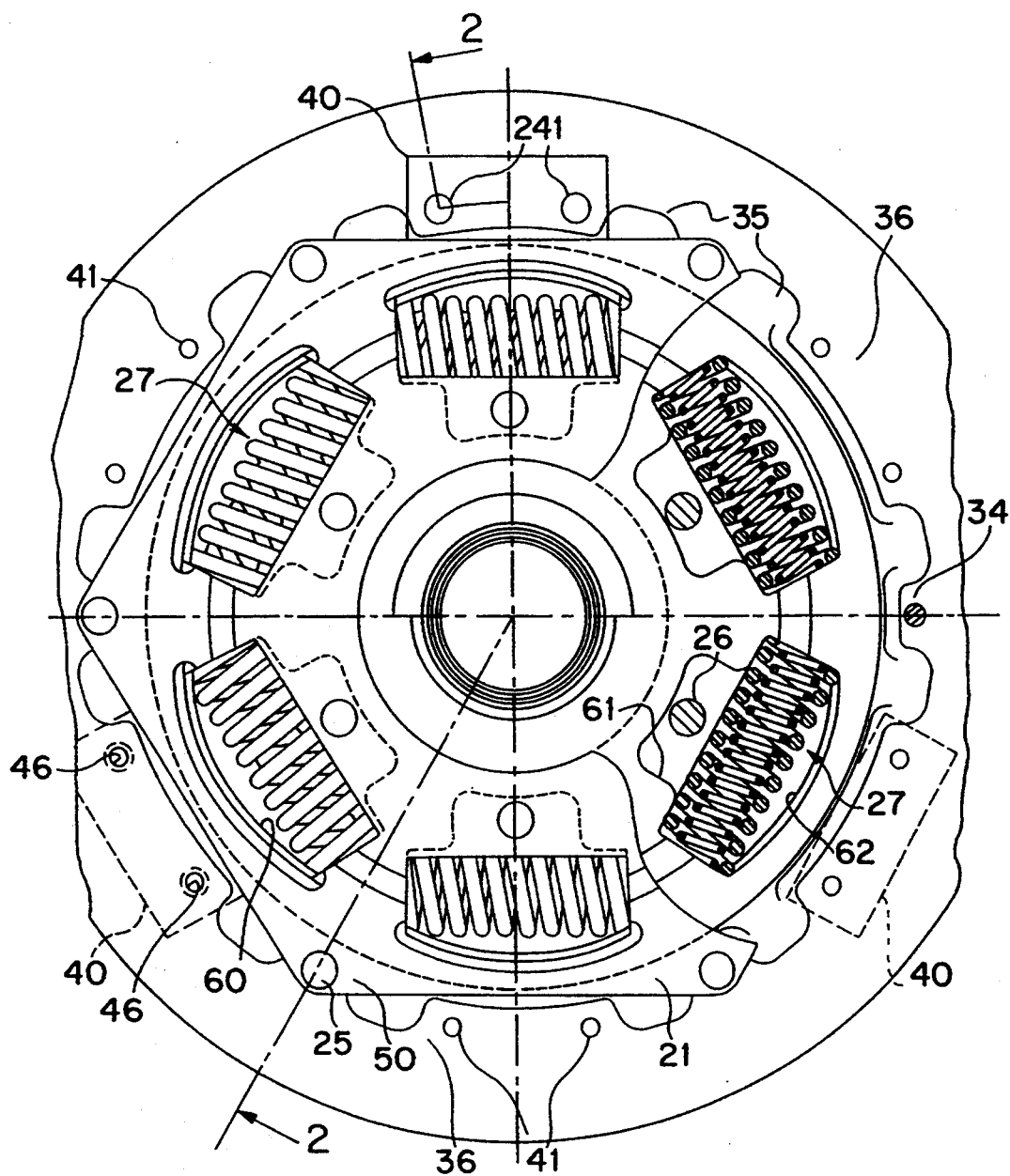
FIG. 1 is a view in elevation showing part of a lock-up clutch in accordance with the invention, with certain portions cut away.

In FIGS. 1 to 3, the base portion 4 is deformed radially inwardly of its wall 5 in order to accommodate the piston 30. In this way, fluid chambers are formed on either side of the piston 30. By inversion of the pressures prevailing in these chambers, the piston 30 is displaced axially along the centring surface 11; then, under the effect of the hydraulic pressure, the piston 30 grips the friction liner 31 between itself (i.e. between the wall 32 of the piston) and the wall 5. The resulting locking effect enables the casing 2 to drive the driven shaft 10 directly. In this example the driven shaft 10 is the input shaft of the gearbox of the vehicle.

In FIG. 1, the input part 21, 22 of the torsion damper 20 includes, in a manner known per se, two guide rings 21 and 22 which are secured together by means of spacer elements 26 which in this example are in the form of bars. In FIG. 3, the equivalent guide rings are indicated at 121 and 122 respectively. A damper plate 24 is located between the guide rings 21 and 22 and is secured to the outer hub 23, 123. It will be noted that in the upper part of FIG. 2, and also in FIG. 3, the damper plate 24 is secured on the outer hub by crimping, though in a modification it may be welded to the latter; but in FIG. 4, the damper plate 24 is integral with the outer hub 123. The output part of the torsion damper thus comprises the damper plate 24 (FIG. 2) or 124 (FIG. 4), and its associated outer hub, 23, 123 respectively.

In FIGS. 1 to 3, the resilient members 27 are in the form of coil springs which are mounted in pairs 27a, 27b, and without any clearance, in windows 60 and 62. These windows are arranged in facing relationship and are formed in the respective guide rings 21 and 22 (FIGS. 1 and 2) or 121 and 122 (FIG. 3), and in the damper plate 24 or 124. These springs 27 and the windows 60 and 62 are in this example spaced apart regularly on a common pitch circle, with six pairs of springs 27 being provided.

The spacer bars 26 (FIGS. 1 and 2) are fitted radially inwardly of the coil springs 27, and pass with a clearance through a window 62, with a passage 61 forming an inward radial extension of the inner edge of the window 62. These spacer bars also secure the piston 30 to the guide rings 21 and 22, the piston 30 being abutted on to the guide ring 22. The other guide ring, 21, has local fastening points 50 (see FIG. 1) at its outer periphery, for securing it to the base of the wall 32 of the piston 30 by means of rivets 25.

In FIGS. 1 and 2, the friction means 28 comprise a resilient ring of the Belleville ring type, the outer periphery of which is slotted for mating cooperation with the spacer bars 26, and for coupling with the latter for rotation therewith. The Belleville ring 28 bears on the guide ring 22 so as to act on the damper plate 24 and to urge the latter into contact with the inner periphery of the other guide ring 21. In this way metallic contact is obtained due to the fact that the clutch is in the oil bath contained in the casing 2.

In FIG. 3, the friction means are indicated by the reference numeral 128, and include, in addition, a friction ring.

It will be noted that the damper plate 24 in FIG. 2 has a cranked cross sectional shape, with a transverse outer peripheral portion being joined, through a fold formed at the level of the springs 27, to an inner peripheral portion, again extending transversely, which is arranged to engage frictionally against the guide ring 21.

The lock-up clutch 1 is characterised in that the piston 30 is provided with a plurality of projecting elements, indicated at 41 in FIGS. 1 and 2 and 141 in FIG. 3, which are made integrally with the piston 30 for mounting at least one balancing member thereon. In FIGS. 1 and 2, this balancing member is denoted by the reference numeral 40, in FIG. 3 by the numeral 140, in FIG. 5 by the numeral 240, and in FIG. 6 by the numeral 340.

In FIGS. 1 and 2, the projecting elements 41 project axially from the above mentioned fastening face of the piston 30. The piston 30 is in the shape of a hollow dish with a base portion 33 having a central hole and delimited by the hub portion, or axial inner flange 234, of the piston 30, together with an axially oriented peripheral wall 37 which is joined to its transverse wall 32, the latter constituting a peripheral flange. The base portion 33 has a cranked shape as can be seen in FIG. 2, as has the base portion 4 of the first shell member 3, 4, in particular for accommodating the coil springs 27 of the torsion damper 20. The major part of the latter is accommodated within the space delimited by the peripheral wall 37 and base portion 33 of the piston 30.

The guide ring 22 is annular in shape, while the guide ring 21 has a non-circular shape, which in this example is polygonal. More precisely, the guide ring 21 is hexagonal, with straight outer edges which delimit the radially projecting fastening points 50 and which enable the rivets 25 to be fitted. The projecting elements 41 are arranged radially inward of the friction liner 31, being in this example on the same pitch circle as the rivets 25.

The base portion 33 of the piston is joined to its radial wall 32 through ribs 35, which are provided for the purposes of stiffening the peripheral wall 37. More precisely, as is best seen in FIG. 1, two of the stiffening ribs 35 define between them a balancing zone 36 which carries two of the projecting elements 41, while the rivets 25 extend through fastening lugs 34 which are provided at the root of the transverse wall 32 between two of the stiffening ribs 35. Thus, between two fastening lugs 34, there are arranged successively (in this order) a stiffening rib 35, a balancing zone 36 and a further stiffening rib 35. The distribution of these elements is regular. The projecting elements 41 are located radially outwardly of the straight outer edges of the guide ring 21.

Thus, on the opposite side from the friction liner 31, on the fastening face of the piston 30 facing towards the turbine wheel 8, it is possible to mount at least one balancing member 40 in the form of a small plate, by means of at least one of the projecting elements 41. In this connection, the plate 40 need only be provided with a hole 46 for force-fitting of the plate on the corresponding projecting element 41, the plate 40 having a straight inner edge for cooperation with the associated straight outer edge of the guide ring 21.

Thus, after the plate has been fitted over the projecting element 41, the free end of the latter is upset (by cold working in this example) so as to form an expanded head 241, whereby the plate 40 is secured by riveting. The balancing plate 40 is thus automatically held against rotation by mating cooperation between its inner edge and the corresponding outer edge of the guide ring 21.

The balancing plates 40 can be fitted in the desired positions so as to provide proper balancing of the clutch 1. This is made possible by the provision of a plurality of the projecting elements which, in this example, are twelve in number.

The balancing plate 40 can of course be engaged, by means of two holes 46, on to two projecting elements 41 as shown in FIG. 1. In this case, the balancing plate may have any suitable shape, since it is the projecting elements 41 themselves that provide the automatic restraint against its rotation. However, for reasons of reliability each balancing plate 40 in this example is rectangular in shape, and cooperates with the corresponding outer edge of the guide ring 21 in such a way that it is prevented from rotating by mating cooperation.

It is of course possible to provide balancing plates 40 having different thicknesses, so as to facilitate balancing. It will also be appreciated that these plates 40 may have large circumferential and radial dimensions.

Again, it is of course possible to reverse these arrangements. Thus for example in FIG. 3, the projecting elements 141 project axially from the face of the piston 30 which faces away from the turbine wheel 8 and torsion damper 20. This face is then opposed to the fastening face of the piston. The projecting elements 141 are located at the same radius as the stiffening ribs 35 and between two consecutive ribs 35, as in FIG. 1.

The torsion damper here has a structure which is similar to that which is described in the above mentioned French patent specification FR 2 668 234A and corresponding U.S. Pat. No. 5,119,911, and reference to those specifications is invited for further detail.

In this connection, in FIG. 3 of the present Application, the torsion damper 20 includes the two guide rings 121 and 122 which are part of its input part, together with the damper plate 124 which is interposed between the two guide rings 121 and 122, this damper plate 124 being fixed with respect to the outer hub 23. The guide rings 121 and 122 are joined together by means of spacer elements as in FIGS. 1 and 2, and the springs 27a, 27b are mounted without any clearance in the windows 60 and 62.

These spacer elements also serve to secure a radial plate 70. In the manner described in the patent specifications just mentioned, this radial plate has sets of tongues 42, 43 which are resiliently deformable axially. The plate 70 is secured, by means of rivets 44 with a spacer 134 interposed, on the fastening face of the piston 30. In this example, the balancing plates 140 are arranged radially inward of these rivets 44.

It will be appreciated that the arrangement in FIGS. 1 and 2 offers improved performance over the arrangement in FIG. 3, because in the clutch of FIGS. 1 and 2 the balancing plates 40 are arranged further outward in the radial direction, i.e. at the same general radius as the friction liners 31. By contrast, in FIG. 3 the (or each) balancing plate 140 is arranged radially inwardly of the friction liners 31.

Figure 5:
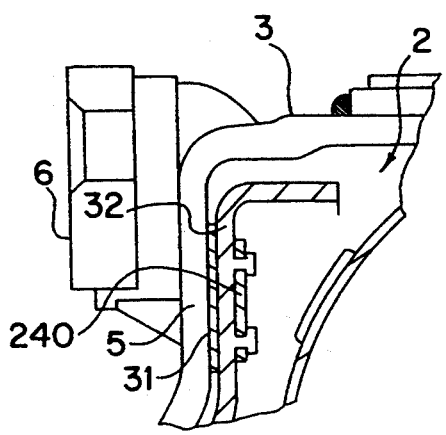
FIG. 5 is a partial view in cross section showing a variant of the lock-up clutch as shown in FIG. 3.
Figure 6:
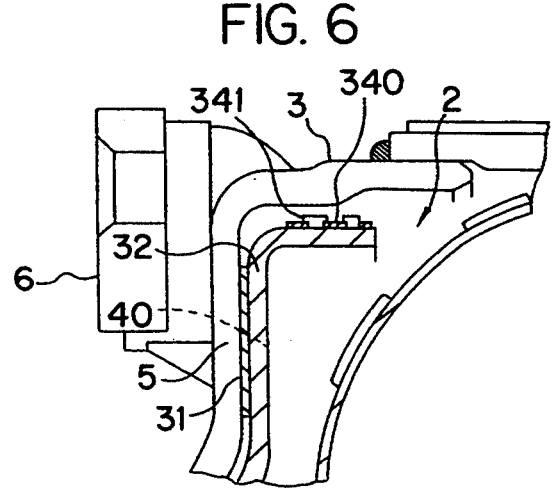
FIG. 6 is a partial view in cross section showing a variant of the lock-up clutch as shown in FIG. 3.

The present invention is of course not limited to the embodiments described above. In particular, the (or each) balancing plate 240 may be fitted at the same radial level as the friction liner 31 on the face of the piston which is directed away from the latter, as is indicated In FIG. 5. In FIG. 6 the (or each) balancing plate 340 is fitted on two projecting elements 341 formed in the outer flange of the piston 30.

Although in FIGS. 1 and 2 the piston 30 has no axial flange at its outer periphery, in FIG. 3 it does have such a flange, so that it is possible to fit a balancing member 140 on this flange, which is provided with projecting elements 141 for this purpose. The balancing element 140 then has the shape of an annular segment.

The torsion damper may of course be arranged for stepped action, with some of the springs 27 being accordingly mounted without any clearance in the windows formed in the guide rings 21 and 22, but with a clearance in the windows of the damper plate 24 or 124.

Similarly, it is possible to reverse the arrangements, with the torsion damper 20.then being adjacent to the wall 4, with the base of the piston spaced away from the latter.

What is claimed:

1. A lock-up clutch for a hydrokinetic coupling apparatus, comprising: a piston having a first, fastening, face and a second face opposed to said first face; and a torsion damper disposed beside said fastening face of the piston and fastened to said fastening face by means of rivets, wherein the piston further has a plurality of integral projecting elements, the clutch further including at least one balancing member fitted on at least one of said projecting elements, said balancing member being secured on at least one said protecting element by riveting.

2. A lock-up clutch according to claim 1, wherein the said projecting elements project axially from the said fastening face.

3. A lock-up clutch according to claim 1, wherein the said projecting elements project axially from the said second face of the piston.

4. A lock-up clutch according to claim 2, wherein the piston is hollow and defines a plurality of stiffening ribs, the said projecting elements being disposed at the same radial level as the said ribs.

5. A lock-up clutch according to claim 4, wherein each of at least one balancing zone is defined by a pair of consecutive said ribs, with said projecting elements being in each of said balancing zones.

6. A lock-up clutch according to claim 5, wherein the torsion damper includes a polygonal guide ring having an outer edge, the or each said balancing member comprising a plate element having a straight edge cooperating with the said outer edge of the said guide ring.

7. A lock-up clutch according to claim 6, wherein each said balancing zone has two said projecting elements, with a said balancing plate element engaged on both projecting elements.

8. A lock-up clutch for a hydrokinetic coupling apparatus, said clutch comprising:

a piston having a first face and a second face opposed to said first face, said piston further including a plurality of integral projecting elements and a plurality of stiffening ribs, wherein each of at least one balancing zone is defined by two consecutive said ribs, with at least one said projecting element disposed in each of said balancing zones;

a torsion damper disposed beside said first face of the piston, the torsion damper includes a polygonal guide ring having an outer edge; and at least one balancing member engaged on said projecting elements, said at least one balancing member comprising a plate element having a straight edge cooperating with said outer edge of said guide ring.

9. A lock-up clutch for a hydrokinetic coupling apparatus, said clutch comprising:

a piston having a first face and a second face opposed to said first face, said piston further including a plurality of integral projecting elements and a plurality of stiffening ribs, wherein each of at least one balancing zone is defined by two consecutive said ribs, with two said projecting elements disposed in each of said balancing zones;

a torsion damper disposed beside said first face of the piston; and at least one balancing member engaged on said two projecting elements.

* * * * *